(12) United States Patent
Damiens et al.

(10) Patent No.: US 10,533,574 B2
(45) Date of Patent: Jan. 14, 2020

(54) COMPOSITE BLADE, COMPRISING A LEADING-EDGE REINFORCEMENT MADE OF ANOTHER MATERIAL

(71) Applicant: Safran Aircraft Engines, Paris (FR)

(72) Inventors: Alexandre Damiens, Saint Ouen l'Aumone (FR); Frédéric Jean-Bernard Pouzadoux, Melun (FR); Gilles Pierre-Marie Notarianni, Brie Comte Robert (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 162 days.

(21) Appl. No.: 15/570,003

(22) PCT Filed: Apr. 28, 2016

(86) PCT No.: PCT/FR2016/050997
§ 371 (c)(1),
(2) Date: Oct. 27, 2017

(87) PCT Pub. No.: WO2016/174357
PCT Pub. Date: Nov. 3, 2016

(65) Prior Publication Data
US 2018/0156232 A1 Jun. 7, 2018

(30) Foreign Application Priority Data
Apr. 29, 2015 (FR) .................... 15 53891

(51) Int. Cl.
*F04D 29/38* (2006.01)
*F01D 5/28* (2006.01)
(Continued)

(52) U.S. Cl.
CPC ........... *F04D 29/388* (2013.01); *F01D 5/147* (2013.01); *F01D 5/282* (2013.01); *F01D 5/288* (2013.01);
(Continued)

(58) Field of Classification Search
CPC .... F04D 29/028; F04D 29/325; F04D 29/388; F05D 2250/73; F05D 2240/303;
(Continued)

(56) References Cited

U.S. PATENT DOCUMENTS

2011/0194941 A1* 8/2011 Parkin .................... B29C 70/48
416/224
2011/0229334 A1* 9/2011 Alexander ............. F01D 5/282
416/224
(Continued)

FOREIGN PATENT DOCUMENTS

EP 2 378 079 A2 10/2011
EP 2 634 368 A2 9/2013
(Continued)

OTHER PUBLICATIONS

Search Report issued in French Patent Application No. 15 53891 dated Oct. 26, 2015.
(Continued)

*Primary Examiner* — Moshe Wilensky
*Assistant Examiner* — Elton K Wong
(74) *Attorney, Agent, or Firm* — Pearne & Gordon LLP

(57) ABSTRACT

The invention relates to a blade made of composite material, provided with a reinforcement (17) made of a stronger material with regard to a leading edge (5) likely to be struck by solid objects, which comprises, under the aerodynamic portion of the blade, extensions (18, 19) attached to the blade root. According to the invention, the extensions (18, 19) are dissymmetric, the extension (18) located on the suction side being generally further back from the leading edge (5) than the extension (19) on the pressure side.

10 Claims, 4 Drawing Sheets

(51) Int. Cl.
  *F01D 5/14* (2006.01)
  *F02C 7/04* (2006.01)

(52) U.S. Cl.
  CPC ............ *F02C 7/04* (2013.01); *F05D 2250/73* (2013.01); *F05D 2300/133* (2013.01); *F05D 2300/603* (2013.01); *Y02T 50/672* (2013.01)

(58) Field of Classification Search
  CPC ......... F05D 2300/133; F05D 2300/603; F05D 2220/36; Y02T 50/672; F02C 7/04
  See application file for complete search history.

(56) References Cited

U.S. PATENT DOCUMENTS

2012/0301292 A1\* 11/2012 Deal ................. F01D 5/147
  415/220
2013/0236323 A1\* 9/2013 Mironets ................ F01D 5/286
  416/229 R
2015/0104325 A1\* 4/2015 Yagi ........................ F01D 5/282
  416/224

FOREIGN PATENT DOCUMENTS

EP  2 811 143 A1  12/2014
GB  2 482 247 A   1/2012

OTHER PUBLICATIONS

International Search Report issued in Application No. PCT/FR2016/050997 dated Jul. 21, 2016.
Written Opinion issued in Application No. PCT/FR2016/050997 dated Jul. 21, 2016.

\* cited by examiner

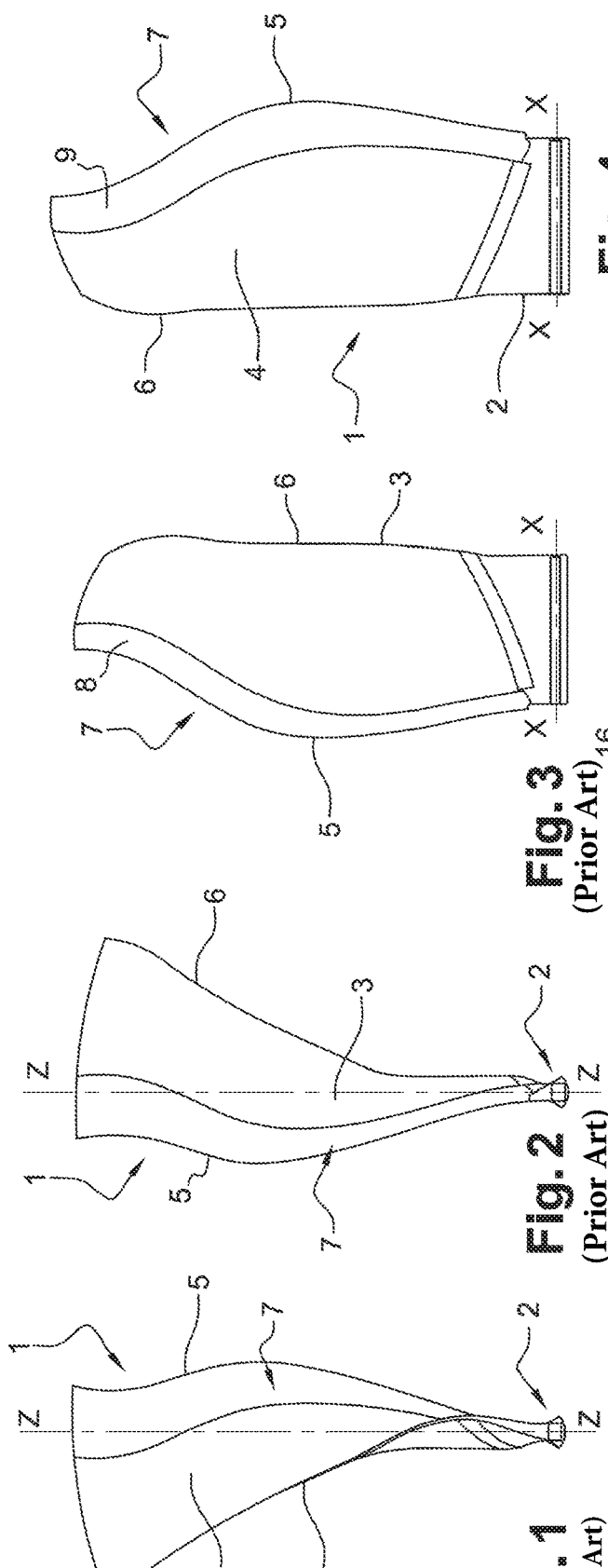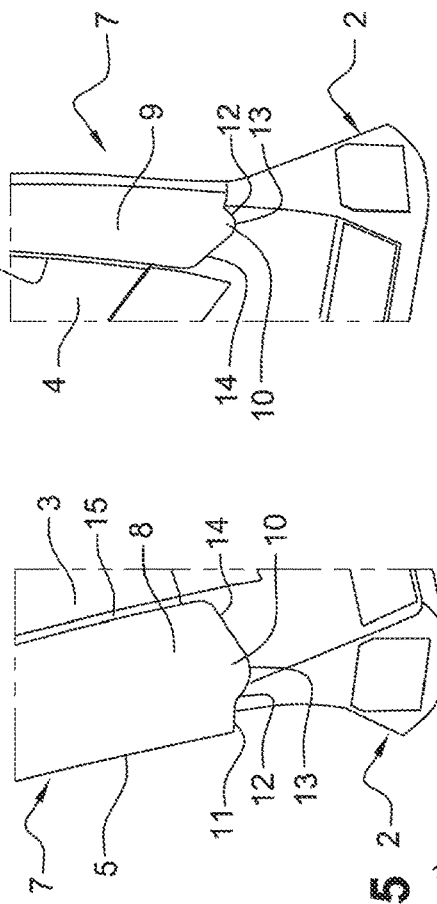

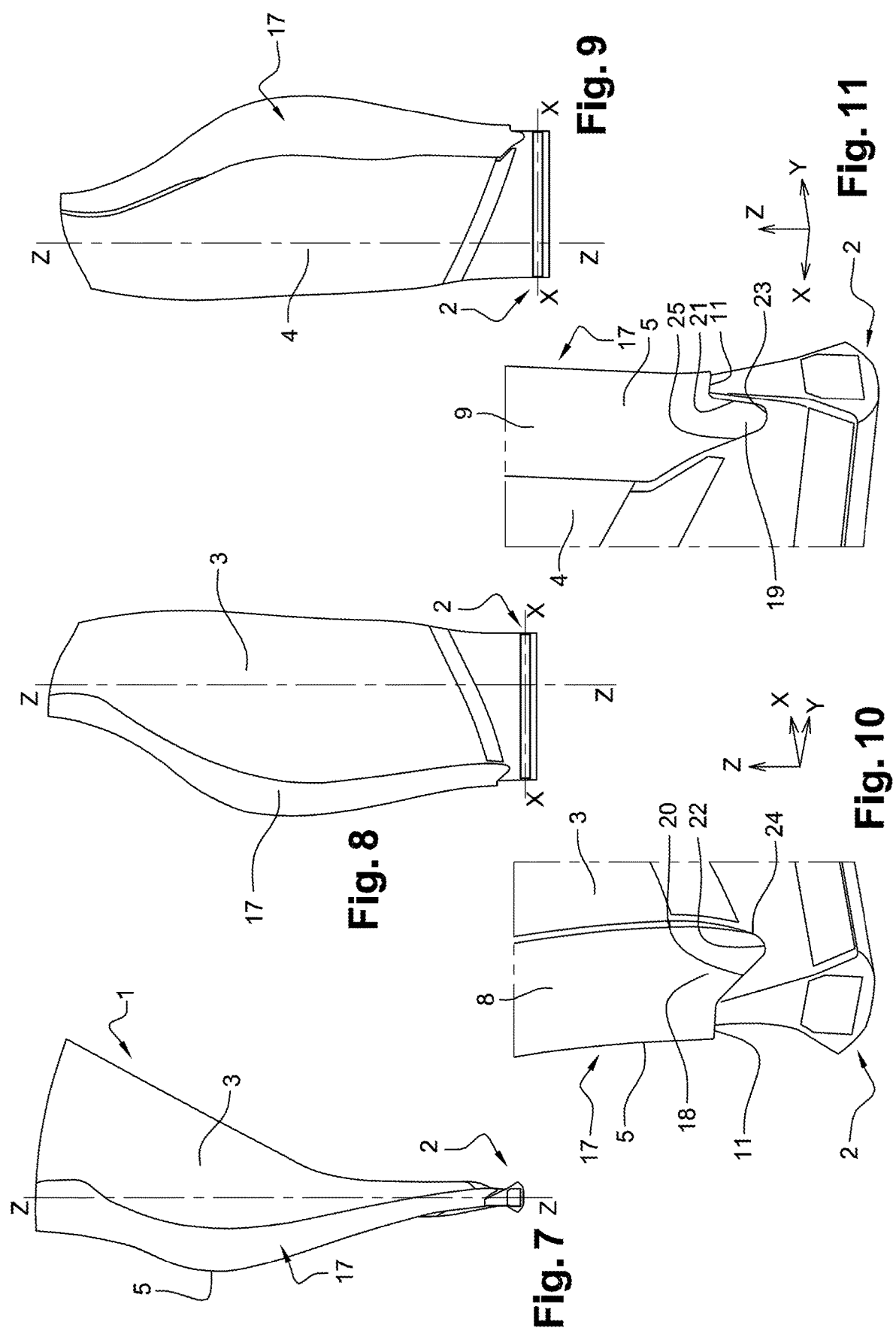

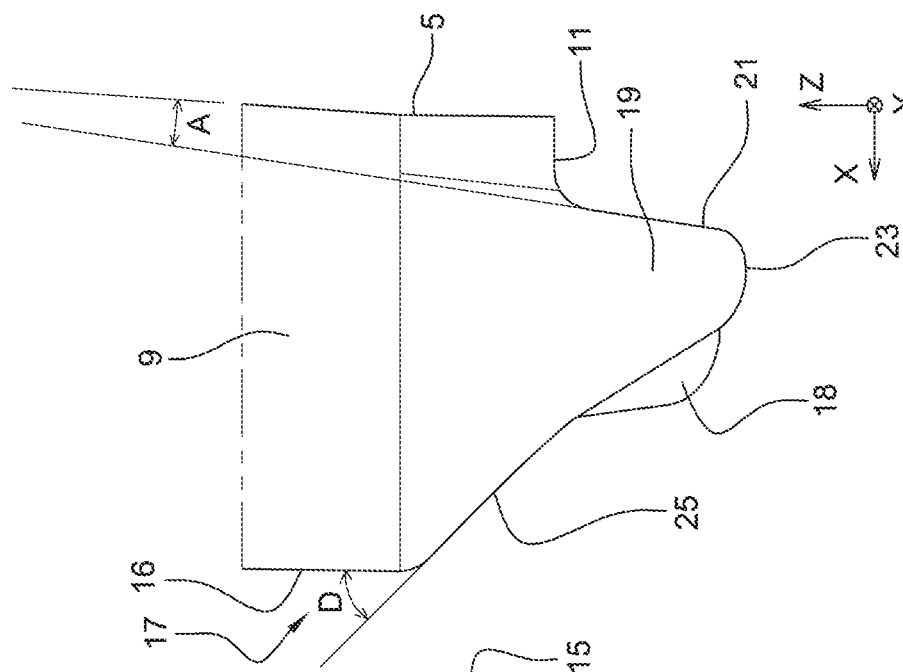
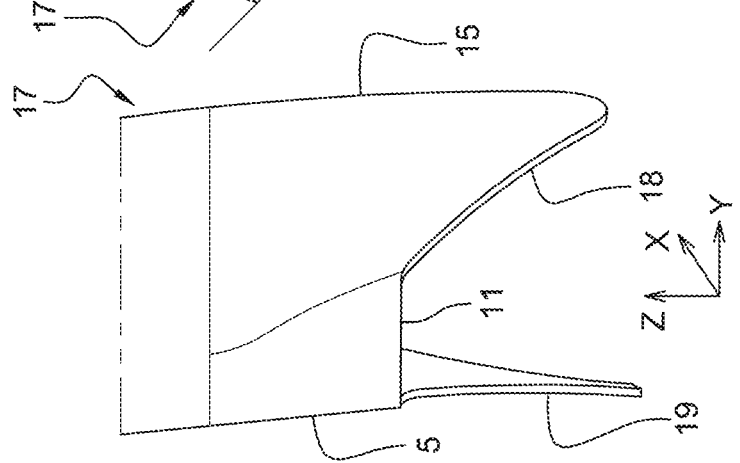
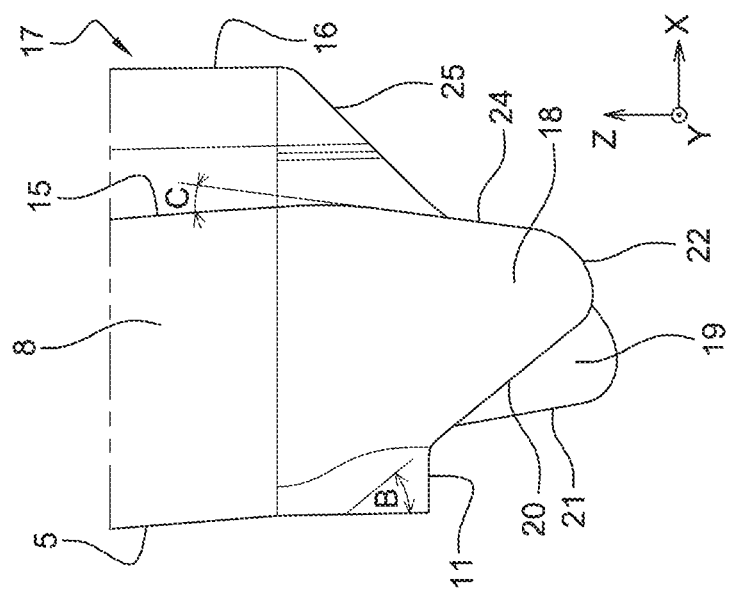

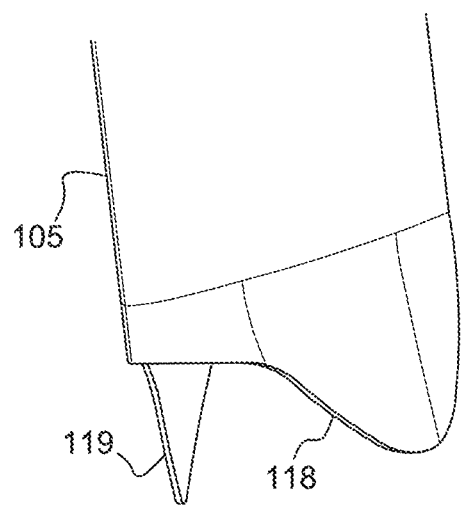
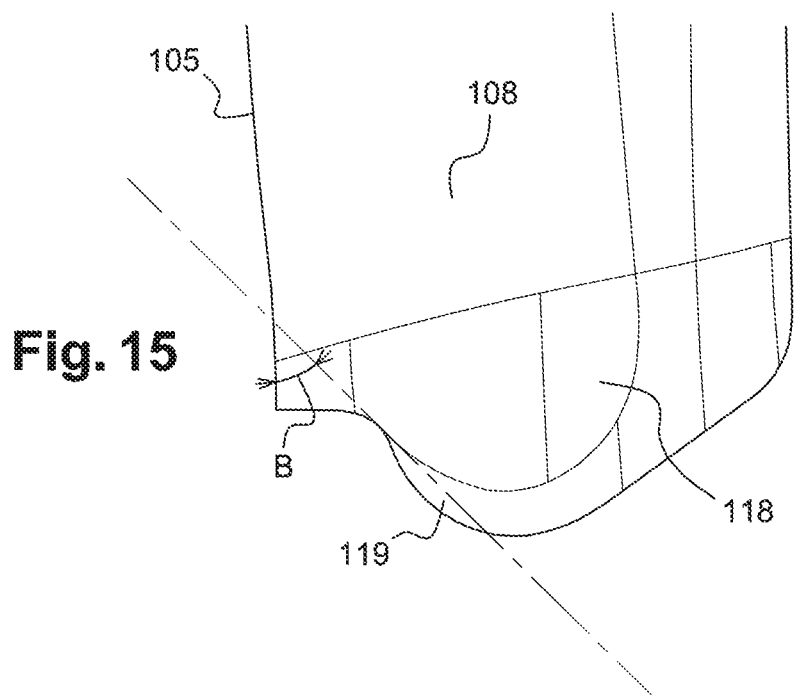
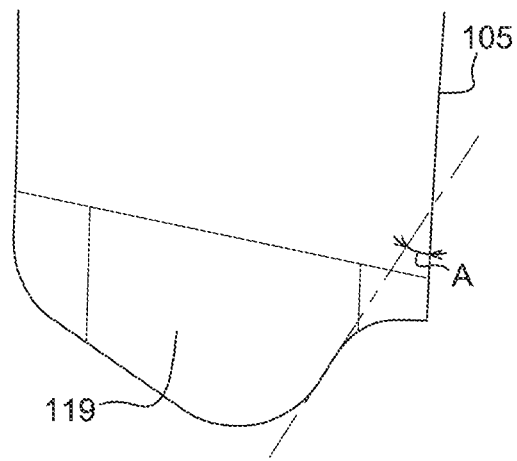

COMPOSITE BLADE, COMPRISING A LEADING-EDGE REINFORCEMENT MADE OF ANOTHER MATERIAL

The invention relates to a composite blade, comprising, besides a structural portion made of a first material, a leading-edge reinforcement made of another material.

Such a structure may be proposed particularly for blowers at the aircraft engine inlet, or for other blade rings exposed to projections of solid foreign bodies liable to damage same due to shocks. The leading edge, which is exposed to these shocks, is formed by the reinforcement, which is made of a more impact-resistant material than that of the structural portion. The structural portion may thus be formed of a composite material comprising polymer, and the titanium leading-edge reinforcement. The documents EP 2 811 143 A1, EP 2 378 079 A2, GB 2 482 247 A and EP 2 634 368 A2 disclose blades equipped with such reinforcements.

The junction between the two portions is subject to significant stress, particularly due to operating vibrations, and it was sought to reduce this stress by designing this invention.

The innovation relates more specifically to the extensions of the reinforcement which extend onto the pressure and suction faces beyond the leading edge (in a direction extending from said leading edge) covering the blade root, which is a part with not aerodynamic role inserted into a disk fixation bearing the blade ring, so as to hold the blade in place. It was more specifically observed that a dissymmetry of the extensions was beneficial for reducing the stress applied on said junction. The dissymmetry relates more specifically to the front portion, near the leading edge, of the extensions, which is subject to stress concentrations. According to the invention, the front edge of the extension of the suction face is further (in a direction extending from the blade root) from the lead edge than that of the pressure face.

This different distance may be obtained if the extensions are limited by a front edge close to the leading edge, a rear edge at a distance from the leading edge and a rounded section joining these two edges, rending the angle formed by the front edge of the pressure face smaller than the corresponding angle formed by the front edge of the suction face with the leading edge.

These aspects, features and advantages of the invention, along with others, will now be described with reference to the following figures:

FIGS. 1, 2, 3, 4, 5 and 6 represent a known composite blade design with leading-edge reinforcements; and FIGS. 7, 8, 9, 10, 11, 12, 13, 14, 15, 16 and 17, two merely illustrative embodiments of the invention.

Hereinafter in the description, terms such as "top" and "bottom", "below" and "above", "lower" and "upper", or "upward" and "downward" are understood with reference to a blade orientation where the root is assumed to be below the aerodynamic portion, and the extension of the leading edge reinforcement, to which the invention relates, is below the rest of the reinforcement; they are also conforming with respect to the orientation of the blade in the figures. In addition, the terms "front" and "rear" are understood with respect to the conventional gas flow direction in the turbo-engine. The axes XX, YY and ZZ plotted in some of the figures, XX along the root 2, ZZ from the root 2 to the vertex of the blade 1 and YY transversal and perpendicular to the above, are also introduced to help understand the description.

FIGS. 1, 2, 3 and 4 respectively represent a composite blade of known design at the trailing edge, at the leading edge, at the suction side, and at the pressure side; and FIGS. 5 and 6 are enlargements of FIGS. 3 and 4 respectively, combining the reinforcement of the leading edge and the blade root.

The blade conventionally comprises a blade 1 having a curved and irregular shape, extending longitudinally along an axis ZZ, responsible for the aerodynamic performances of the blade, and a root 2 at the bottom of the blade 1, widening towards the bottom of the blade and extending longitudinally along an axis XX substantially orthogonal to the axis ZZ, so as to be suitable for being inserted into a fixation having a complementary cross-section of a disk and holding the blade therein. The blade 1 is limited by a suction side 3 and a pressure side 4 joined with a leading edge 5 and a trailing edge 6 which are opposing. The blade comprises a structural portion, which forms the largest portion of the blade 1 and of the root 2, and a reinforcement 7 located at the leading edge 5 and which is more resistant than the structural portion. This reinforcement 7 comprises, as seen more clearly in FIGS. 5 and 6, a suction face 8 locally covering the suction side 3 of the structural portion, and a pressure face 9 locally covering the pressure side 4 thereof. The faces 8 and 9 join at the front to form the leading edge 5. The faces 8 and 9 each comprise an extension 10, which extends below the lower end of the leading edge 5 and therefore overlaps with the root 2, covering a portion of the surface thereof. At the junction of the blade 1 and of the root 2, an edge 11 of the faces 8 and 9 forms the lower end of the leading edge 5. From the edge 11 and opposite the leading edge 5, the extensions 10 comprise an oblique front edge 12, with an inclination in the downward direction ZZ towards the bottom of the root 2, a rounded section 13, and an oblique rear edge 14, with an inclination in the direction ZZ rising progressively towards the top of the root 2. The extensions 10 are identical in this known design, except optionally to the rear, furthest from the leading edge 5, where the rear edges 14 may be of different lengths up to the respective rear edges 15 and 16 of the suction face 8 and of the pressure face 9, since the suction 8 and pressure 9 faces may be of different widths in the direction X-X: the rear edge 15 of the suction face 8 may thus be closer to the leading edge 5 than the rear edge 16 of the pressure face 9.

FIGS. 7 to 14 represent the invention. FIGS. 7, 8, 9, 10 and 11, correspond to FIGS. 2, 3, 4, 5 and 6 respectively, and FIGS. 12, 13 and 14 represent separately the leading edge reinforcement at the suction side, obliquely at the leading edge, and at the pressure side.

The leading-edge reinforcement now bears the reference 17. It differs from the previous leading-edge reinforcement 7 by the extensions covering the root 2, which are now referenced by 18 and 19 for the suction face 8 and the pressure face 9, respectively.

The extensions 18 and 19 are herein dissymmetrical. This specific feature makes it possible to reduce the mechanical stress applied to the junction of the reinforcement 17 and of the structural portion forming the rest of the blade. Indeed, stress concentrations are likely to appear at the bottom of the reinforcement 17 and close to the leading edge 5, which is an area of structural irregularity of the blade. Furthermore, the stress is very different between the suction side 3 and the pressure side 4. It is therefore essential to have a freedom of design of the extensions 18 and 19 involving the dissymmetry thereof. An important consideration is that the extension 18 on the suction side 3 will gain by being positioned further from the leading edge 5, in the direction XX, than the extension 19 on the pressure side 4. This is obtained by moving the front edge 20 of the extension 18 on the suction side 8 further away from the leading edge 5 than the front edge 21 of the extension 19 on the pressure side 9; in the embodiment actually proposed herein, by rendering the front edge 21 of the extension 19 of the pressure face 9 more parallel with the profile of the leading edge 5 (at the lower portion thereof, represented substantially vertically in FIGS. 12 and 14) than the front edge 20 of the extension 18 of the suction face 8; the corresponding angles between the leading edges 5 and the front edges 21 and 20 (angles A in FIG. 14 and B in FIG. 12), where therefore A<B, may respectively be less than 30°, preferentially between 5° and 25°, and between 30° and 60°, and preferentially between 35° and 50°, for example. Conversely, the rear edges 24 and 25 may respectively form angles C less than 30° and D between 30° and 60°, or more generally D>C, with the edges 15 and 16 of the suction 8 and pressure 9 faces at a distance from the leading edge 5. The front edges 20, 21 and rear edges 24, 25 are joined by rounded sections 22 and 23 useful for enabling satisfactory production and not creating stress concentration at a connection angle.

Due to the greater width of the pressure face 9 in the direction XX, the extension 19 of this side may be wider (again in the direction XX) than the extension 18, have a greater depth (in the direction ZZ) below the leading edge 5, and a greater surface area also.

The invention may be implemented in many ways. Any embodiment envisaged with finite-element calculations could be validated.

FIGS. 15, 16 and 17 illustrate a different, but equally satisfactory, embodiment of a leading-edge reinforcement, with the same terms of representation as FIGS. 12, 13 and 14 respectively; the corresponding portions bear the corresponding reference numbers increased by "100": as such, the leading edge 105, the pressure 108 and suction 109 faces, and the extensions 118 and 119 are featured. Herein, A=20° and B=45° whereas A was equal to 9°, and B to 40°, in the previous embodiment. Reductions of 30% in static stress were observed at the leading edge of the reinforcement, and of 5% in the structural portion, with respect to a symmetrical conventional reinforcement.

What is claimed is:

1. A composite blade, comprising:
a structural portion made of one material and a leading-edge having a leading edge reinforcement made of another material, the leading edge reinforcement comprising a pressure face and a suction face, and the leading edge extending along a longitudinal extension direction extending between a blade root of the structural portion and a distal end of the composite blade, opposite the blade root,
the pressure and suction faces joining at the leading edge and comprising respective extensions each at least partially covering the blade root and extending along the longitudinal extension direction in a direction from the distal end towards the blade root a distance beyond the leading edge,
the extensions each being limited by a respective front edge and a respective rear edge, the respective rear edge being disposed at a distance from the leading edge that is farther than a distance of the respective front edge from the leading edge, and
the front edge of the pressure face forms a first angle with the leading edge that is smaller than a second angle formed by the front edge of the suction face with the leading edge.

2. The composite blade according to claim 1, characterised in that the first angle has a measurement being not more than 30°, and that the second angle has a measurement being between 30° and 60°.

3. The composite blade according to claim 2, characterised in that the rear edge of the pressure face forms a third angle with an edge of the pressure face at a distance from the leading edge, and that the rear edge of the suction face forms a fourth angle with an edge of the suction face at a distance from the leading edge, wherein the third angle is greater than the fourth angle.

4. The composite blade according to claim 3, characterised in that the third angle has a measurement between 30° and 60°, and the fourth angle has a measurement of not more than 30°.

5. The composite blade according to claim 1, characterised in that at each respective extension, a respective rounded section joins the respective front edge and the respective rear edge.

6. The composite blade according to claim 1, characterised in that the blade root extends in a root extension direction transverse the longitudinal extension direction, and the pressure face being wider along the root extension direction than the suction face.

7. The composite blade according to claim 1, characterised in that the extension of the pressure face has a greater depth beyond the leading edge along the longitudinal extension direction than the extension of the suction face.

8. The composite blade according to claim 1, characterised in that the material of the structural portion is a composite, and the material of the leading-edge reinforcement is titanium.

9. The composite blade according to claim 1, characterised in that the composite blade is a blower blade at an aircraft engine inlet.

10. A blower portion of an aircraft engine, comprising:
an inlet, and a composite blade according to claim 1, the blade root of the composite blade coupled to a fixation bearing disposed at the inlet.

* * * * *